(12) United States Patent
Spinger et al.

(10) Patent No.: US 12,422,119 B2
(45) Date of Patent: Sep. 23, 2025

(54) LED MODULE FOR VEHICLE HEADLIGHT AND VEHICLE HEADLIGHT WITH SUCH LED MODULE

(71) Applicant: LUMILEDS LLC, San Jose, CA (US)

(72) Inventors: Benno Spinger, Aachen (DE); Kang Lu, Shanghai (CN)

(73) Assignee: Lumileds Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/688,295

(22) PCT Filed: Nov. 12, 2021

(86) PCT No.: PCT/CN2021/130311
§ 371 (c)(1),
(2) Date: Feb. 29, 2024

(87) PCT Pub. No.: WO2023/029214
PCT Pub. Date: Mar. 9, 2023

(65) Prior Publication Data
US 2024/0377041 A1    Nov. 14, 2024

(51) Int. Cl.
*F21S 41/153*    (2018.01)
*B60Q 1/04*    (2006.01)
(Continued)

(52) U.S. Cl.
CPC .............. *F21S 41/153* (2018.01); *B60Q 1/04* (2013.01); *F21S 41/143* (2018.01); *F21S 41/285* (2018.01)

(58) Field of Classification Search
CPC ...... F21S 41/153; F21S 41/143; F21S 41/285; F21S 41/28; F21S 41/2805; B60Q 1/04; F21V 5/007; F21V 5/08; G02B 19/0066; G02B 19/0056; G02B 27/0961; G02B 3/0043; F21W 2102/165; F21W 2102/663; F21Y 2105/16
See application file for complete search history.

(56) References Cited

U.S. PATENT DOCUMENTS 9,285,092 B2    3/2016    Anzai et al.
9,611,996 B2    4/2017    Brendle
(Continued)

FOREIGN PATENT DOCUMENTS

DE          10147277 A1 *   4/2003   .......... B60Q 1/2696
DE       102018220295       5/2020
(Continued)

OTHER PUBLICATIONS

International Preliminary Report on Patentability Chapter I issued Mar. 5, 2024 for PCT International Application No. PCT/CN2021/130311.
(Continued)

*Primary Examiner* — Erin Kryukova
(74) *Attorney, Agent, or Firm* — Volpe Koenig

(57) ABSTRACT

An LED module for a vehicle headlight and a vehicle headlight are described. The LED module includes an array of LEDs (22) and an optic (23) opposite the array of LEDs (22). The optic (23) is configured to receive light from the array of LEDs (22) and direct at least part of the received light. The optic (23) has a light passing area (24) configured to pass light directly from the array of LEDs.

20 Claims, 5 Drawing Sheets

(51) Int. Cl.
*F21S 41/143* (2018.01)
*F21S 41/20* (2018.01)

(56) References Cited

U.S. PATENT DOCUMENTS

| | | | |
|---|---|---|---|
| 10,082,264 B2* | 9/2018 | Hossfeld | F21S 43/40 |
| 10,174,900 B2 | 1/2019 | Schöne | |
| 10,591,126 B2 | 3/2020 | Mandl | |
| 10,948,148 B2 | 3/2021 | Cornelissen et al. | |
| 11,014,489 B2 | 5/2021 | Muegge | |
| 11,428,379 B2 | 8/2022 | Schreiber et al. | |
| 2006/0083016 A1* | 4/2006 | Okamura | F21V 7/0091 362/245 |
| 2011/0063857 A1* | 3/2011 | Li | G02B 3/0043 362/336 |
| 2012/0091917 A1* | 4/2012 | Vinther | H05B 45/00 315/312 |
| 2013/0223089 A1* | 8/2013 | Danner | F21S 41/143 362/511 |
| 2017/0276309 A1* | 9/2017 | Nakazawa | B60Q 1/143 |
| 2018/0178247 A1* | 6/2018 | Aizawa | H01L 33/62 |
| 2019/0032880 A1* | 1/2019 | Kim | F21S 41/285 |
| 2019/0086051 A1 | 3/2019 | Motohashi | |
| 2019/0264886 A1* | 8/2019 | Sousek | F21S 43/31 |
| 2020/0172001 A1* | 6/2020 | Muegge | F21S 43/31 |

FOREIGN PATENT DOCUMENTS

| | | |
|---|---|---|
| EP | 2306074 | 4/2011 |
| JP | 2007-109532 | 4/2007 |
| WO | 2018/172140 | 9/2018 |
| WO | 2019/207147 | 10/2019 |

OTHER PUBLICATIONS

International Search Report and Written Opinion of the International Searching Authority mailed May 31, 2022 for PCT International Application No. PCT/CN2021/130311.

* cited by examiner

LED MODULE FOR VEHICLE HEADLIGHT AND VEHICLE HEADLIGHT WITH SUCH LED MODULE

CROSS REFERENCE TO RELATED APPLICATION(S)

This application is a § 371 application of International Application No. PCT/CN2021/130311, filed Nov. 12, 2021, which claims the benefit of International Application No. PCT/CN2021/116672, filed Sep. 6, 2021, which are incorporated by reference as if fully set forth.

BACKGROUND

Light emitting diodes (LEDs), which may include, for example, all semiconductor light emitting devices including, for example, diode lasers, more and more replace older technology light sources like halogen and gas-discharge lamps (also referred to as conventional lamps) due to superior technical properties like, for example, energy efficiency and lifetime. This may also be true for demanding applications, for example in terms of luminance, luminosity, and/or beam shaping, such as, for example, vehicle headlighting.

SUMMARY

An LED module and a vehicle headlight are described. The LED module includes an array of LEDs and an optic opposite the array of LEDs. The optic is configured to receive light from the array of LEDs and direct at least part of the received light. The optic has a light passing area configured to pass light directly from the array of LEDs.

BRIEF DESCRIPTION OF THE DRAWINGS

A more detailed understanding can be had from the following description, given by way of example in conjunction with the accompanying drawings wherein.

DETAILED DESCRIPTION

Figure 1:
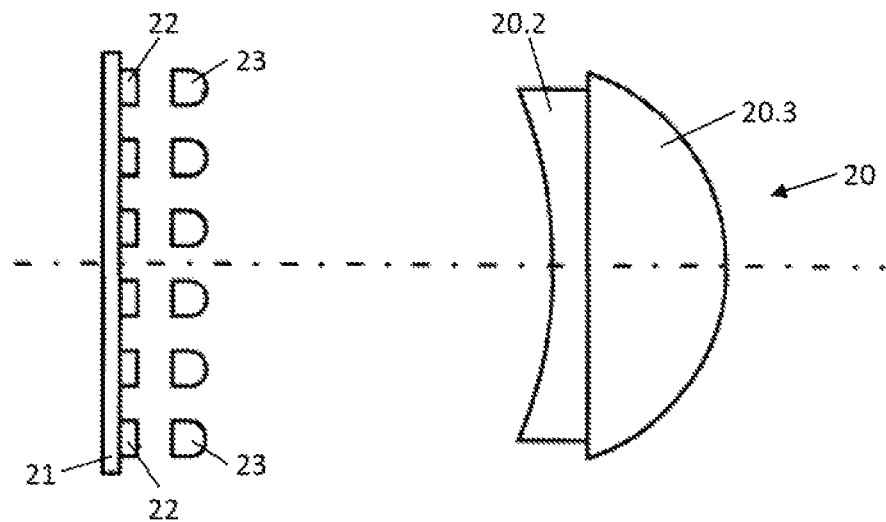
FIG. 1 is a schematic cross-section of an example LED module.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present disclosure. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures, unless explicitly stated otherwise. It will be understood that these terms are intended to encompass different orientations of the device in addition to the orientation depicted in the figures.

Unaided LEDs typically have a light emission characteristic much different from conventional lamps in that, for example, they typically emit in a Lambertian instead of a circular symmetric pattern. Accordingly, new optical systems adapted to the LEDs may be desirable.

While newest developments in LED vehicle headlighting may employ densely packed arrays of many hundreds of miniaturized LEDs or even envisage tens or hundreds of thousands of so-called micro LEDs, nowadays, matrix headlights with about one hundred LEDs or even just 32 LEDs are and will be economically interesting products still for many years. This might become even more important due to their cost advantage when falling LED prices will allow LED headlights to enter the market for middle and even low-priced cars.

Such medium to low resolution LED arrays may include relatively bulky LEDs surrounded by relatively thick reflecting walls to help avoid cross-talk between neighboring LEDs. These LEDs may be mounted to a carrier like a printed circuit board (PCB) with relatively large (dark) gaps between the light emitting areas of neighboring LEDs in the array. While there are attempts to directly image such LED arrays on the road by a single projection lens or lens group, in such setup, it may be very hard to generate a uniform light intensity on the road by, for example, avoiding the gaps between neighboring LEDs to be imaged to darker spaces between the bright spots of the images of the light emitting areas of the LEDs.

Therefore, optical systems imaging the LED array on the road may employ a sequence of primary and secondary optics. The primary optic may, for example, collimate the 180° Lambertian emission pattern of the LEDs to a restricted angular range and remove or at least alleviate the gaps between the LEDs by imaging their light emitting areas to directly adjacent widened areas. Typical primary optics may be finger-like optical arrays as, for example, shown in EP2306074A2, which is hereby incorporated by reference herein. In a sense, the primary optic may transform the array of light emitting areas of the LEDs in the LED array, with the gaps in-between, into a uniform light emitting area, which may then be imaged by the secondary optic, for example, in the simplest case, a single projection lens, onto the road in front of the vehicle.

Figure 3:
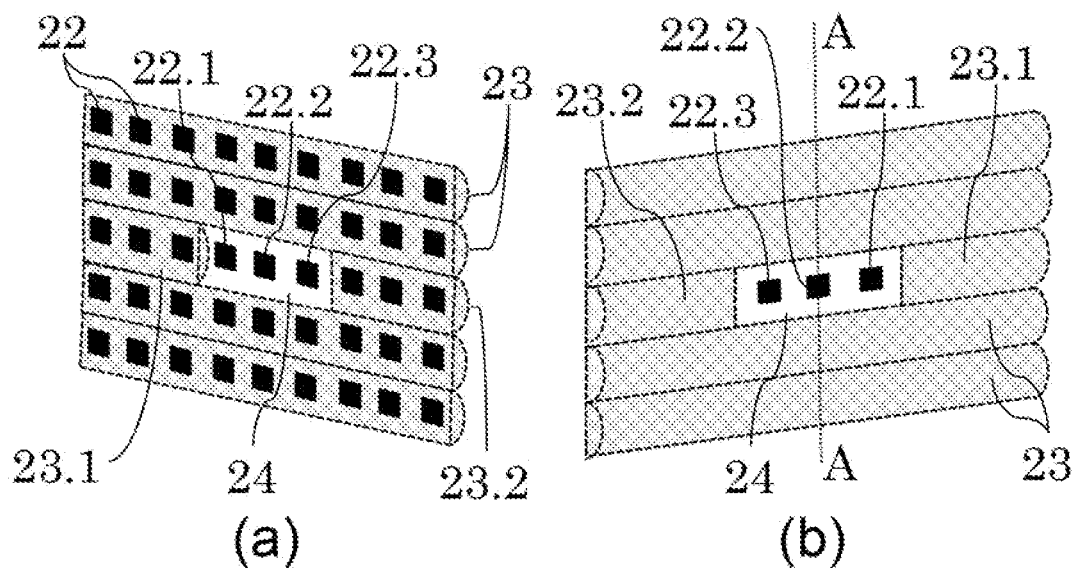
FIG. 3 is a schematic perspective view of another example LED module.

FIG. 1, reproduced from FIG. 3 of DE102014112937A1, which is hereby incorporated by reference herein, is a schematic cross-section of an example LED module that includes an array of LEDs 22 mounted on a carrier 21 with a primary optic that includes cylinder lenses 23, one per LED row, and a secondary optic 20 that includes two lenses 20.2, 20.3. The secondary optic lenses 20.2, 20.3 may have specifically designed surface textures and shapes as well as curvatures that may at least alleviate spherical and chromatic aberration in the image formed by the secondary optic 20 on the road. Such multiple part secondary optics for correction purposes are also employed in the already mentioned EP2306074A2.

Figure 2:
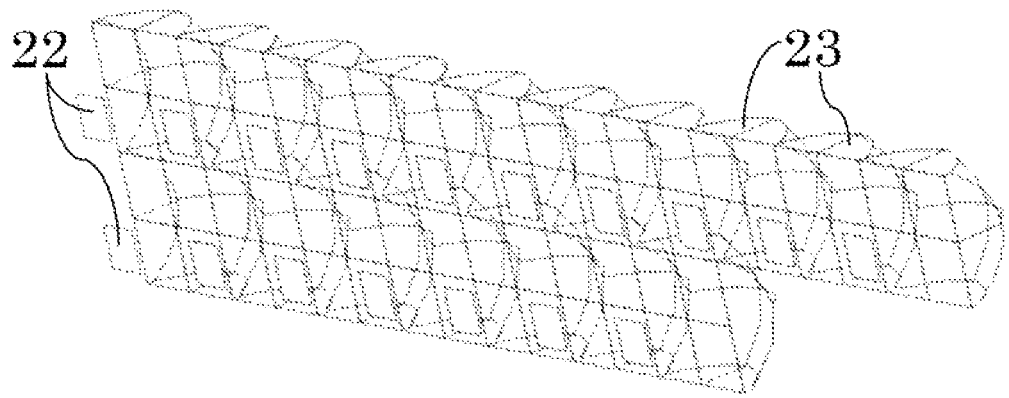
FIG. 2 is a schematic perspective view of another example LED module.

FIG. 2, reproduced from FIG. 2 of WO2018172140A1, which is hereby incorporated by reference herein is a schematic perspective view of another example LED module where the array of LEDs 22 may be imaged by a primary optic lens array, which may be an array of lenslets 23 with each lenslet 23 covering a particular LED.

While a primary optic could take any shape, practically, for cost reasons, primary optics are typically made of uniform components. For example, in the above mentioned examples, the fingers of the finger-like primary optic may all be the same, the cylinder lenses may be identical for each LED row and uniform along the extension of the row, and the lenslets of the lens array may all be the same. In consequence, each LED of the LED array may be imaged by the primary optic in the same way, irrespective, for example, of the position of the LED within the LED array. This means that the shaping of the beam and its intensity distribution on the road may need to be solely performed by the secondary optic.

A vehicle headlight may have areas with high light intensity and areas with much lower light intensity. For example, a low beam may require high intensity immediately below the bright/dark cutoff line whereas a high beam may have high intensity in the middle of the road in the far field towards the horizon. On the other hand, intensity far besides the road boundaries might be considerably lower. Achieving such large intensity differences may pose high requirements on the secondary optic. Shifting part of the beam forming to the primary optic may be possible, for example, by designing individually shaped lenses before each LED in the LED array. However, this may considerably increase system design effort and manufacturing cost as it may, for example, require a complex multitude of mold shapes. Such situation can at least be alleviated by observing that the task for the secondary optic to create high intensity areas on some parts of the road, while limiting intensity, for example, far besides the road borders, may be simplified by foreseeing light passing areas in the primary optic, wherein "light passing area" may indicate a spatial part of the primary optics without optical function (e.g., light passing through such light passing area may be, at least on a practical scale, neither collimated nor imaged nor otherwise optically processed).

In the simplest case, the light passing areas may be open areas in the primary optic, such as areas where the material of the primary optic is spared and the light passes without any interaction. As open areas may compromise the mechanical stability of the primary optic, embodiments described herein may also encompass filled areas as light passing areas. Such filled areas, by choice of material or shape, may be designed to minimize their interaction with the light passing through them. For example, they may be plate-like while the remaining parts of the primary optic (e.g., the parts with the optical function) may have the shape of cylinder lenses or lenslets as shown, for example, in FIGS. 1 and 2. Of course, also a transparent plate with a refraction index different from the surrounding air will interact with the light passing through it. However, as compared with the interaction of the light passing through the functional areas of the primary optic, such interaction is negligible. A transparent plate, for example, will only do a minor parallel shift of a light ray impinging at an oblique angle on the plate, such translation being much smaller than the collimation effect of the cylinder lenses and lenslets, and, thus, being negligible for the purposes of the embodiments described herein.

FIG. 3 is a schematic perspective view of an example LED module. In the example illustrated in FIG. 3, the LED module includes LEDs 22 arranged in an array of 5 rows by 9 columns and a primary optic that includes row-wise arranged cylinder lenses 23. The row-wise cylinder lenses 23 may be one piece with one another and may leave an open area 24 in the primary optic's mid-part, functioning as the light passing area described above. In the example illustrated in FIG. 3, the middle cylinder lens includes two parts 23.1, 23.2 on the outer sides leaving free the space 24 in-between. The left part (a) of FIG. 3 shows this from the back, making the array of LEDs 22 fully visible. The right part (b) shows it from the front with only the middle LEDs 22.1, 22.2, 22.3 in the open area 24 being visible and the other LEDs 22 of the array being hidden by the cylinder lenses 23.

Figure 4:
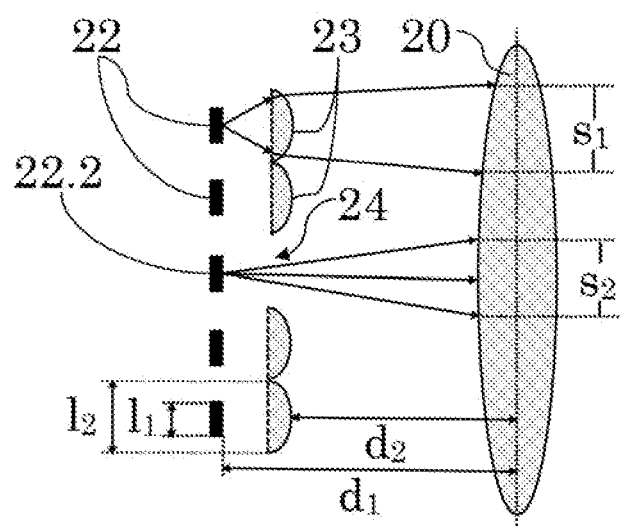
FIG. 4 is a schematic cross-sectional view of the example LED module of FIG. 3 taken along the line A-A.

To illustrate the optical working principle of the optics described herein, FIG. 4 is a schematic cross-section of FIG. 3 taken along line A . . . A. The cylinder lenses 23 in front of the rows of LEDs 22 may (i) collimate the Lambertian emission pattern of the LEDs in the vertical, (ii) increase the light emitting area from that of the LED 22 (e.g., from $l_1$) to that of the exit face of the cylinder lenses 23, such as to $l_2$, and (iii) shift the position of the light emitting area towards the secondary optic 20 (e.g., decrease the distance $d_1$ of the light emitting area of the LEDs 22 to the distance $d_2$ of the exit face of the cylinder lenses 23). A typical main purpose of using the cylinder lenses 23 for an automotive headlight may be to use them as a widening optic for the purpose of a vertical widening of the light emitting area. The parts $s_1$ of the secondary optic 20 that receive light from the exit faces of the cylinder lenses 23 may be designed in a way to image such exit faces in a vertically wide beam on the road (e.g., for obtaining a far reaching high beam). To do so, typically, the parts $s_1$ will have a focal area at the position of the exit faces of the cylinder lenses 23.

While a vertically wide beam, such as, for example, a far reaching high beam, may be desirable, such widening may come at the cost of reduced intensity. For example, the widening of the light emitting areas of LEDs 22 to the exit faces of cylinder lenses 23, in the same proportion, may reduce the luminance of the light emitting areas, thus reducing the illumination on the road. While such may be unavoidable, nevertheless, higher intensity may be desired at some parts of the road, such as immediately below the bright/dark cutoff of a low beam and in the far most part of a high beam, as mentioned above.

For providing at least improvement in enabling such partial higher intensities, by leaving a light passing area 24 in the primary optic, the higher luminance light emitting area of the LEDs 22.1, 22.2, 22.3 behind such light passing area 24 can be directly imaged by the secondary optic 20. For optimal performance, to do so, the parts $s_2$ of the secondary optic 20 that receive direct light from the LEDs 22.1, 22.2, 22.3 may be designed in a way to directly image the LEDs' high luminance light emitting areas on the road. To do so, the second parts $s_2$ may, for example, be designed having a focal area at the position of the light emitting areas of the LEDs 22.1, 22.2, 22.3 behind the light passing area 24.

Appropriately selecting the position of the light passing area 24, for example together with the optical design of the secondary optic 20, may allow the secondary optic 20 to directly image the LEDs 22.1, 22.2, 22.3 behind the light passing area 24 into those parts of the beam that may require higher intensity. Thus, the light passing area may create a very easy and cheap to manufacture possibility to structure the primary optic in a way to provide different intensity values in different beam parts.

Figure 5:
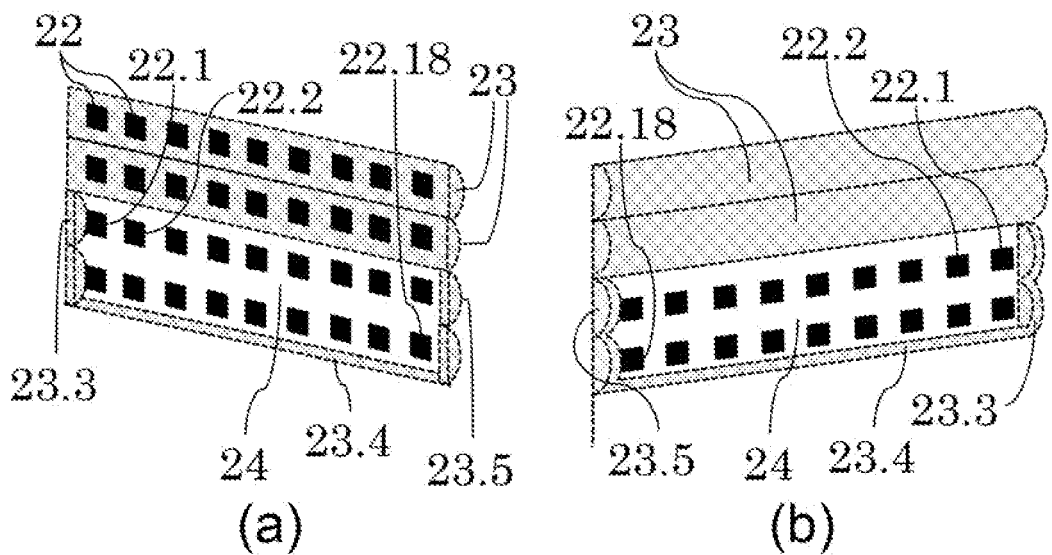
FIG. 5 is a schematic perspective view of another example LED module.

FIG. 5 is schematic perspective view of another example LED module. The illustration is analogous to the one of FIG. 3, the left part (a) showing the module from the back displaying all LEDs 22, and the right part (b) from the front showing only the LEDs 22.1, 22.2 up to 22.18 visible through the open area 24 in the primary optic, the open area functioning as a light passing area again. In the example illustrated in FIG. 5, the LEDs 22 are arranged in 4 rows (and again in 9 columns). The complete lower two rows of LEDs 22.1, 22.2 up to 22.18 may be in the open area 24. This means that the primary optic, in its lower half, may have no cylinder lenses 23 in front of the LEDs but only an outer frame made of edge parts 23.3, 23.4, and 23.5 (which may be used, for example, to maintain the outer shape and size of the primary optic).

Such placement of the light passing area 24 may have a particular advantage in a high beam when the secondary optic images the light emitting areas of the lower two LED rows directly into the far field of the high beam. Such direct imaging of the higher luminance LED light emitting areas might increase the intensity of the far field illumination and, thus, the range of the high beam; whereas the dark areas between the LEDs, after imaging to such far distance, may not be annoying or may not even be visible to a vehicle driver.

Instead of placing the light passing area 24 in front of the lower LED rows, in other applications, the opposite may be advantageous, for example placing the light passing area 24 in an upper part of the primary optic. For example, for a fog light, it may be useful to leave the optical function of the primary optic away for some upper LED rows to obtain a more intense beam immediately in front of the vehicle.

Figure 6:
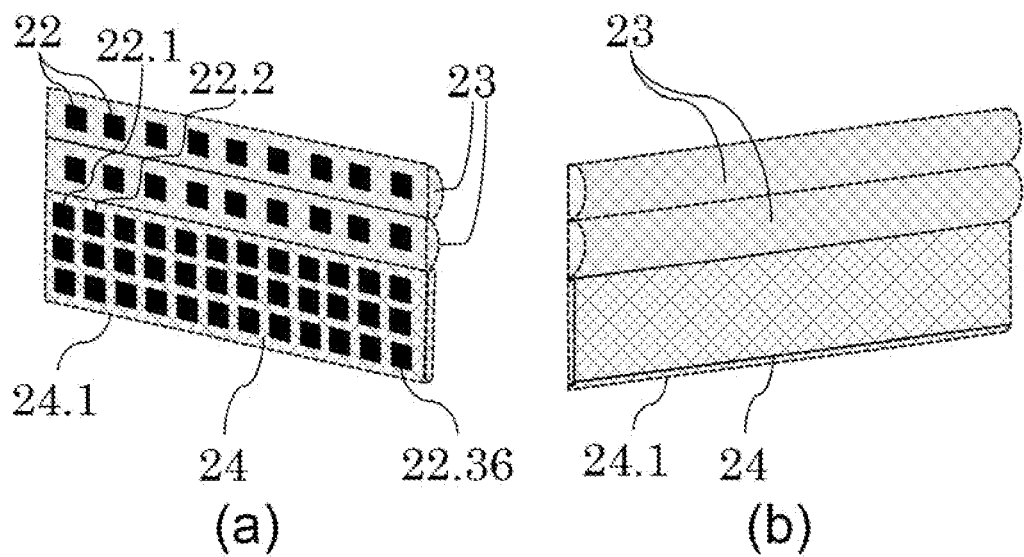
FIG. 6 is a schematic perspective view of still another example LED module.

FIG. 6 is a schematic perspective view of still another example LED module. This embodiment uses the same way of illustration as FIG. 5 and varies from FIG. 5 in two respects.

Firstly, the light passing area 24 may not be embodied as an open area but as a transparent plate 24.1 that may be made of the same material as, and be one part with, the cylinder lenses 23. This variation pays attention to the fact that the construction of FIG. 5 with the outer frame of (narrow) edge parts 23.3, 23.4, and 23.5 may be fragile. Of course, if the lamp housing of the vehicle headlight receiving the LED module does not need such a frame, then a simple solution may be not using the frame (e.g., just using the cylinder lenses 23 as primary optic). However, if the lamp housing expects a continuous periphery of the primary optic in the region of the LED matrix, using a plate 24.1 contiguous with the cylinder lenses 23 may be an advantageous solution from the point of view of improved mechanical stability.

Secondly, while keeping the size of the light emitting area of the LEDs 22, the density of the LEDs 22 behind the light passing area 24 may be increased from a 2×9 array to a 3×12 one. Thus, in FIG. 6, there are 36 LEDs 22.1, . . . , 22.36 behind the light passing area 24. Increasing the density of LEDs 22 while keeping the size of the light emitting area of each LED 22 may mean shrinking the distance between neighboring LEDs 22. Such may nowadays be possible by using thinner reflecting walls and improved placement techniques for the LEDs 22. Smaller distances between neighboring LEDs 22 may alleviate the problem of dark gaps between the light emitting areas, thus easing the task of the secondary optic to generate a homogenous illumination on the road ahead of the vehicle.

Instead of increasing the number of LEDs 22 behind the light passing area 24 as shown in FIG. 6, the gaps between the light emitting areas of neighboring LEDs may also be shrunk by increasing the light emitting area of each LED 22 and by any suitable combination of increasing the number of LEDs and size of their light emitting areas.

Using the same luminance of the light emitting areas of the LEDs 22 behind the light passing area 24 than behind the functional areas of the primary optic may increase the luminance passed by the light passing area 24 and further support creating high-intensity lit areas on the road, useful, for example, for the high beam in the far field. Of course, if such is not desired for a particular function, LEDs with reduced luminance may be used behind the light passing area 24.

Instead of the array of cylinder lenses 23 with each cylinder lens 23, except for the light passing area 24, covering a row of the LED matrix, a single (e.g., large) cylinder lens may be used as a primary optic covering the complete LED array except for the light passing area. Alternatively, a lens array like in FIG. 2 may be used, leaving away the lenslets within the light passing area 24.

For the secondary optic 20, instead of a single projection lens as shown in FIG. 4, more complex systems may be used. For example, one might use a group of lenses where at least one of the lenses, in shape, size, material, texture, and/or curvature of its surfaces may be designed to close the dark gaps between neighboring LEDs in the LED array (e.g., with the lens group being designed for imaging the light emitting areas of the LEDs in a way that no noticeable dark spots appear between their images). In such lens group, design effort for at least one lens may alternatively or in addition be used for correcting spherical and/or chromatic aberration. Good results may already be achievable with two lenses but may be improved by using systems of four lenses or even more.

Design of the secondary optic for closing the gaps between neighboring LEDs of the LED array may not be necessary for the LEDs imaged by the primary optic as such closing may already be performed by the primary optic. For the directly imaged LEDs, for example for the LEDs behind a light passing area of the primary optic, however, closing the gaps by the secondary optic may improve the beam performance. As the directly imaged light may hit only a part of the secondary optic, such as area $s_2$ in FIG. 4, such may be taken into account to simplify the design of the secondary optic. For example, when using a group of lenses for the secondary optic, a specific lens of the group, with an extension of $s_2$ only, may be foreseen to just shape the beam for this part $s_2$ of the secondary optic.

In some embodiments, LED arrays may be made up of two rows of LEDs with 12, 16, or 20 LEDs each. However, arrays with 84 LEDS or more may be used for higher resolution.

The example LED modules described herein may be combined with a secondary optic in an integrated LED module, which may be mounted in a lamp housing of a vehicle headlight.

Figure 7:
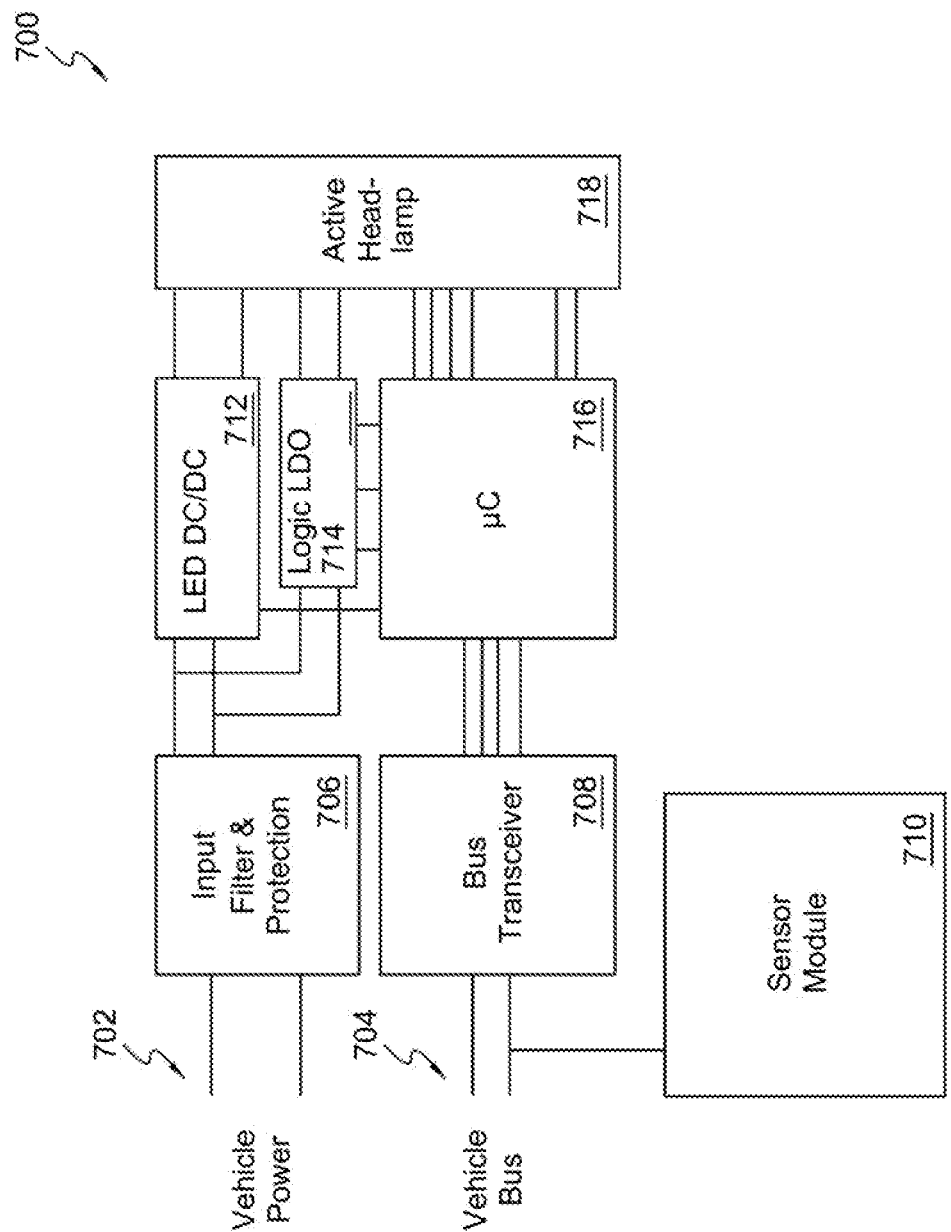
FIG. 7 is a diagram of an example vehicle headlamp system.

FIG. 7 is a diagram of an example vehicle headlamp system 700 that may incorporate one or more of the embodiments and examples described herein. The example vehicle headlamp system 700 illustrated in FIG. 7 includes power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active head lamp 718.

The power lines 702 may have inputs that receive power from a vehicle, and the data bus 704 may have inputs/outputs over which data may be exchanged between the vehicle and the vehicle headlamp system 700. For example, the vehicle headlamp system 700 may receive instructions from other locations in the vehicle, such as instructions to turn on turn signaling or turn on headlamps, and may send feedback to other locations in the vehicle if desired. The sensor module 710 may be communicatively coupled to the data bus 704 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 700. In FIG. 7, the headlamp controller may be a micro-controller, such as micro-controller (μc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 712 may be coupled between the input filter and protection module 106 and the active headlamp 718 to receive filtered power and provide a drive current to power LEDs in the LED array in the active headlamp 718. The LED DC/DC module 712 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active headlamp 718 to provide power to the micro-controller 716 and/or electronics in the active headlamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active headlamp 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 8:
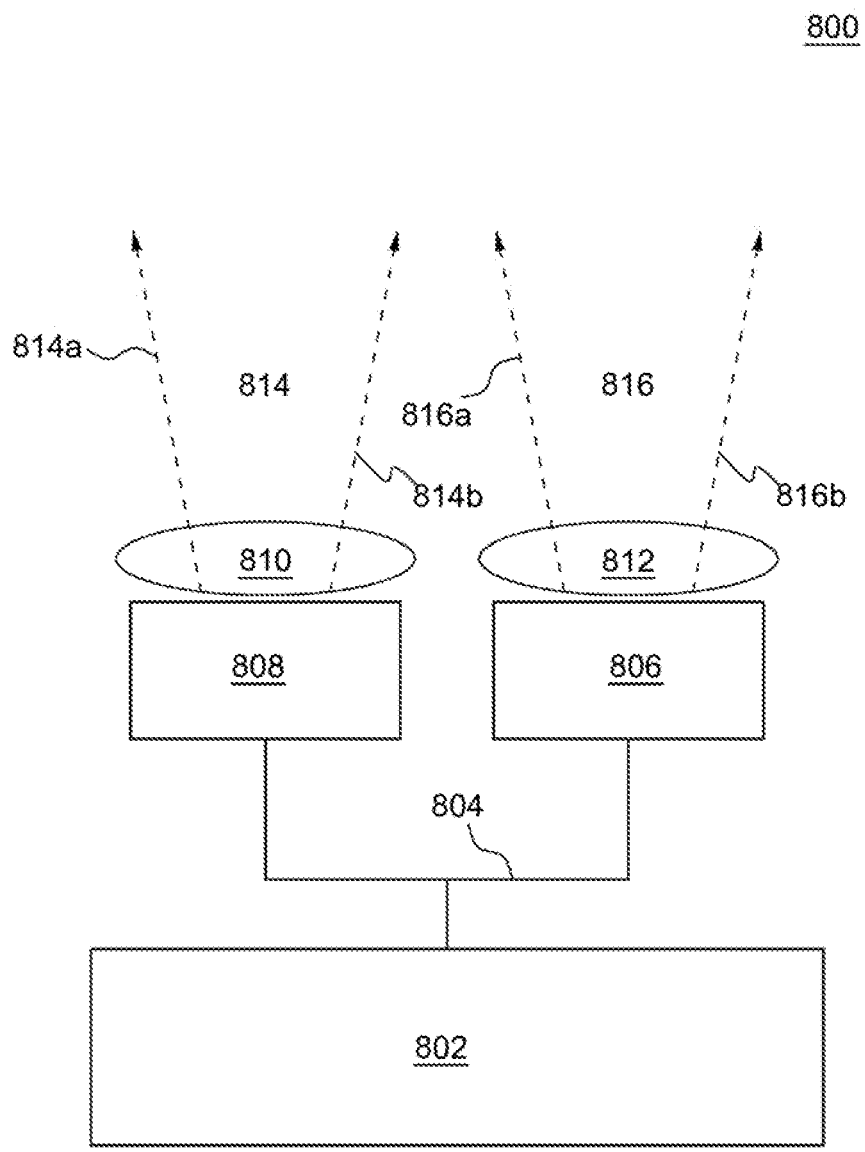
FIG. 8 is a diagram of another example vehicle headlamp system.

FIG. 8 is a diagram of another example vehicle headlamp system 800. The example vehicle headlamp system 800 illustrated in FIG. 8 includes an application platform 802, two LED lighting systems 806 and 808, and secondary optics 810 and 812.

The LED lighting system 808 may emit light beams 814 (shown between arrows 814a and 814b in FIG. 8). The LED lighting system 806 may emit light beams 816 (shown between arrows 816a and 816b in FIG. 8). In the embodiment shown in FIG. 8, a secondary optic 810 is adjacent the LED lighting system 808, and the light emitted from the LED lighting system 808 passes through the secondary optic 810. Similarly, a secondary optic 812 is adjacent the LED lighting system 806, and the light emitted from the LED lighting system 806 passes through the secondary optic 812. In alternative embodiments, no secondary optics 810/812 are provided in the vehicle headlamp system.

Where included, the secondary optics 810/812 may be or include one or more light guides. The one or more light guides may be edge lit or may have an interior opening that defines an interior edge of the light guide. LED lighting systems 808 and 806 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 808 and 806 in a desired manner, such as, for example, with a gradient, a chamfered distribution, a narrow distribution, a wide distribution, or an angular distribution.

The application platform 802 may provide power and/or data to the LED lighting systems 806 and/or 808 via lines 804, which may include one or more or a portion of the power lines 702 and the data bus 704 of FIG. 7. One or more sensors (which may be the sensors in the vehicle headlamp system 800 or other additional sensors) may be internal or external to the housing of the application platform 802. Alternatively, or in addition, as shown in the example vehicle headlamp system 700 of FIG. 7, each LED lighting system 808 and 806 may include its own sensor module, connectivity and control module, power module, and/or LED array.

In embodiments, the vehicle headlamp system 800 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 806 and 808 may be sensors (e.g., similar to sensors in the sensor module 710 of FIG. 7) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the disclosed concept. Therefore, it is not intended that the scope of the disclosure be limited to the specific embodiments illustrated and described, but the scope of protection is only limited by the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light-emitting diode (LED) module comprising:
   an array of rows and columns of a plurality of LEDs, and
   a primary optic opposite the array, the primary optic comprising:
      at least one lens configured to collimate a Lambertian emission pattern emitted by a first subset of the LEDs to a restricted angular range, wherein the subset comprises less than all, and more than one, of the plurality of LEDs, and
      a light passing area having no lenses and configured to pass light directly from a second subset of the LEDs without optical processing of the light.

2. The LED module according to claim 1, wherein the light passing area is one of an aperture in the primary optic or a transparent plate that is integral with the primary optic and formed from the same material.

3. The LED module according to claim 1, wherein a distance between two neighboring LEDs opposite the light passing area is smaller than a distance between two neighboring LEDs opposite an area of the primary optic other than the light passing area.

4. The LED module according to claim 1, wherein the light passing area is located in at least one of:
   a center of the primary optic,
   a lower part of the primary optic, or
   an upper part of the primary optic.

5. The LED module according to claim 1, wherein the primary optic is a widening optic.

6. The LED module according to claim 5, wherein the at least one lens comprises one of:
   a cylinder lens covering the array of LEDs except for LEDs located adjacent the light passing area,
   an array of cylinder lenses with each cylinder lens of the array covering a row of the array of LEDs except for LEDs located adjacent the light passing area, or
   an array of lenslets with each of the lenslets of the array covering an LED of the array of LEDs except for LEDs located adjacent the light passing area.

7. The LED module according to claim 1, wherein the array of LEDs comprises one of:
   a 2 by 12 array of LEDs,
   a 2 by 16 array of LEDs, and
   a 2 by 20 array of LEDs.

8. A vehicle headlight comprising:
   an LED module comprising:
      an array of a plurality of LEDs, and
      a primary optic opposite the array, the primary optic comprising:
         at least one lens configured to collimate a Lambertian emission pattern emitted by a first subset of the LEDs to a restricted angular range, wherein the subset comprises less than all, and more than one, of the plurality of LEDs; and
         a light passing area having no lenses and configured to pass light directly from a second subset of the LEDs without optical processing of the light; and
   a lamp housing on which the LED module is mounted.

9. The vehicle headlight according to claim 8, further comprising a secondary optic.

10. The vehicle headlight according to claim 9, wherein the primary optic is configured to direct the Lambertian emission pattern toward the secondary optic, and wherein the light passing area is configured to pass the light directly from the array to the secondary optic.

11. The vehicle headlight according to claim 9, wherein the secondary optic comprises:
    a single projection lens, and
    a group of lenses, at least one lens of the group of lenses having a surface curved to image two neighboring LEDs in a row of the array without a darker area between images of the two LEDs.

12. The vehicle headlight according to claim 9, wherein the secondary optic comprises:
    a group of lenses with at least one lens of the group of lenses being configured to reduce at least one of spherical and chromatic aberration in an image of the array.

13. The vehicle headlight according to claim 9, wherein the secondary optic comprises a group of two to four lenses.

14. The vehicle headlight according to claim 9, wherein the secondary optic comprises at least one of:
    a part having a focal area at an exit face of the primary optic, and
    a part having a focal area at a light emitting area of an LED of the array of LEDs opposite the light passing area of the primary optic.

15. The vehicle headlight according to claim 8, wherein the light passing area is one of an aperture in the primary optic or a transparent plate that is integral with the primary optic and formed from the same material.

16. The vehicle headlight according to claim 8, wherein a distance between two neighboring LEDs opposite the light passing area is smaller than a distance between two neighboring LEDs opposite an area of the primary optic other than the light passing area.

17. The vehicle headlight according to claim 8, wherein the light passing area is located in at least one of:
    a center of the primary optic,
    a lower part of the primary optic, or
    an upper part of the primary optic.

18. The vehicle headlight according to claim 8, wherein the primary optic is a widening optic.

19. The vehicle headlight according to claim 8, wherein the at least one lens comprises one of:
    a cylinder lens covering the plurality of LEDs except for the light passing area, an array of cylinder lenses with each cylinder lens of the array covering a row of the plurality of LEDs except for the light passing area, or an array of lenslets with each of the lenslets of the array covering an LED of the plurality of LEDs except for LEDs located adjacent the light passing area.

20. The vehicle headlight according to claim 8, wherein the array comprises one of:

a 2 by 12 array of LEDs,
a 2 by 16 array of LEDs, and
a 2 by 20 array of LEDs.

* * * * *